United States Patent [19]
Rio

[11] 3,976,571
[45] Aug. 24, 1976

[54] REDOX RESIN PROCESS
[75] Inventor: André Rio, Lyon, France
[73] Assignee: Rhone-Poulenc S.A., Paris, France
[22] Filed: Oct. 23, 1974
[21] Appl. No.: 517,252

[30] Foreign Application Priority Data
Oct. 26, 1973 France .............................. 73.38281

[52] U.S. Cl. .............................. 210/38 B; 260/51.5
[51] Int. Cl.² ........................................... C02B 1/14
[58] Field of Search ................. 260/51.5, 54, 2.1 C; 210/24, 37, 38

[56] References Cited
UNITED STATES PATENTS

| | | | |
|---|---|---|---|
| 2,927,096 | 3/1960 | Soloway | 260/2.1 C |
| 3,660,317 | 5/1972 | Masatsugu | 260/2.1 C |
| 3,755,161 | 8/1973 | Yokota et al. | 210/38 B |
| 3,847,841 | 11/1974 | Motani et al. | 210/24 |
| 3,864,327 | 2/1975 | Marchant | 210/24 |

Primary Examiner—Charles N. Hart
Assistant Examiner—Ivars Cintins
Attorney, Agent, or Firm—Cushman, Darby & Cushman

[57] ABSTRACT

A redox resin capable of removing reducible metal ions effectively from aqueous solutions is described. This resin is obtained by polycondensation of a mixture of formaldehyde, pyrocatechol and an aromatic amine.

6 Claims, No Drawings

REDOX RESIN PROCESS

This invention relates to a process of using a redox resin based on pyrocatechol/formaldehyde in extracting reducible metal ions, in particular hexavalent chromium and divalent mercury, from effluents. By "redox resin", as used herein, is meant a resin which functions by oxidation and reduction. Such resins have been described by M. G. CASSIDY in "OXIDATION-REDUCTION POLYMERS", pages 1 and 2, Interscience Publishers.

In certain countries drinking water must not contain chromium, for example in France (Official Journal of Nov. 24 1964). Likewise, mercury must be removed from effluents. Chromium metal is not toxic, but certain of its derivatives, namely trivalent chromium salts and, especially, chromic acid and its salts, are poisonous to living beings; in the case of humans, the fatal dose of potassium dichromate is 0.25 to 0.30 g. However amounts as little as 0.05 g can cause gastric disorders. It is thus very important to remove all sources of pollution by hexavalent chromium, since the latter, even at very low doses, accumulates mainly in the liver, the kidneys and the endocrine glands of man.

The main source of pollution by hexavalent chromium is connected with the disposal of spent chromium plating baths and the water used for rinsing articles issuing from chromium plating baths.

The origin of effluents containing mercury is diverse; three main sources may be mentioned, namely mercury catalyst residues (used, for example, in the manufacture of vinyl chloride or acetaldehyde), residues obtained during the electrolysis of sodium chloride in a mercury-containing cell to form sodium hydroxide and chlorine, and residues from the manufacture of organomercury pesticides. Before discarding these residues which are soluble in a natural environment, it is absolutely essential to remove all traces of mercury which, when concentrated by algae and plankton, can enter the nutrition cycle and present a serious risk to human life.

Various methods are used at the present time to remove mercury or chromium, such as ion exchange resins and inorganic filters. These methods are not sufficiently effective. It is known that certain redox resins such as resins based on phenol, resorcinol, pyrogallol, cresol or pyrocatechol, which have been treated with formaldehyde, fix certain metal ions—see MYASOEDOVA, J. Analit. Khem., 23, page 504 (1968). The extent to which the metal ions are fixed, however, remains very low. Moreover, mercury and hexavalent chromium are not mentioned, extraction of the latter metal being very difficult especially when it is in oxidised form.

A process for the preparation of a granular redox resin which is insoluble in water and which consists of a polycondensate of formaldehyde, pyrocatechol and an aromatic diamine has now been found according to the present invention. This process is characterised in that the polycondensation is carried out on a suspension, in an inert diluent to which an alcohol containing 3 to 20 carbon atoms has been added, of a mixture of formaldehyde, pyrocatechol and an aromatic diamine in which the diamine constitutes 5 to 35 mol % of the mixture of pyrocatechol and diamine, the proportion of formaldehyde is 1.1 to 1.5 mols per mol of pyrocatechol and 2.2 to 3 mols per mol of diamine, and in that the polycondensation is followed by a heat treatment at about 70° to about 110°C, followed by removal of the alcohol present in the resin.

As in the case with other phenolic resins, the condensation can be effected by heating the reagents in the above proportions, in the presence of a strong acid, for example hydrochloric acid, which acts as a catalyst.

If the reaction is carried out in aqueous solution without taking special precautions, a polycondensate in pulverulent form is obtained. In order to prepare it in the form of granules which are easy to handle and which allow liquids to pass through it easily, the reaction is carried out in suspension in an inert diluent which is not miscible with water and in the presence of a non-volatile alcohol, the role of which is firstly to exert a moderating effect on the reaction which, without this, would be too fierce and would be accompanied by the whole setting solid, and secondly to swell the polycondensate granules formed.

Any liquid which is not miscible with water, which is inert with respect to the reagents and which has a density generally from 0.7 to 1.5, preferably from 1 to 1.3, and a boiling point preferably of at least 100°C, can be used as the diluent.

By "non-volatile" alcohol, there is meant an alcohol which has 3 to 20 carbon atoms and preferably has a boiling point of at least 100°C. Isoamyl alcohol is particularly suitable. This alcohol is subsequently removed, especially by washing the resin with a solvent.

The heat treatment is carried out at a temperature from 70° to 110°C. The duration of this is not critical, and a period from 1 to 3 hours is generally suitable. It can be carried out on the granules either when they are suspended in the reaction medium or after they have been filtered off. It is, however, preferred to carry out the heat treatment on the suspension.

On filtration, granules are obtained, the average diameter of which is generally between 0.01 and 5 mm. For optimum use, it is preferred to remove granules of diameter less than 0.2 mm, by screening those obtained in the first instance.

Examination under an electron microscope (magnification; 2,000 to 10,000) reveals a very special structure for the granules which are found to be more or less round, covered with protuberances which are themselves rounded but covered with cracks and are very porous. The granules can be fused to form agglomerates. This special structure seems to be connected with the presence of the aromatic diamine. In fact, a pyrocatechol/formaldehyde resin prepared under identical conditions assumes the form of small spherical balls with a smooth surface, which can at times be fused to form agglomerates.

Diamino-diphenyl-methane, ortho-phenylenediamine, para-phenylenediamine and, preferably, meta-phenylenediamine may be mentioned as suitable aromatic diamines.

In order to measure the amount of diamine in the mixture various samples of resin can be prepared in accordance with an identical procedure, and the following test carried out on samples: 1 g of polymer is stirred with 100 cm$^3$ of an aqueous solution of potassium dichromate containing 1 g of chromium/liter, for 1 hour, and the chromium remaining in solution is measured by atomic absorption. The weight of hexavalent chromium fixed is determined by difference.

The results obtained with different proportions of meta-phenylenediamine are to be found in the following table:

| Proportion of diamine (mols per 100 mols of diamine + pyrocatechol) | Proportion of $Cr^{6+}$ fixed in 1 hour (mg/g of resin) |
|---|---|
| 10 | 64 |
| 23 | 74 |
| 50 | 18 |
| 100 | 25 |

Maximum activity of the resin is observed for a proportion of diamine of 5 to 35 mol % especially 10 to 32 mol %.

The resins prepared according to the process of this invention fix hexavalent chromium ions, whether they are in the form of the acid or in the form of chromic acid salts, and, to a lesser extent, they fix trivalent chromium ions.

It has also been found that other metal ions in the oxidised form such as, for example, divalent mercury or trivalent iron can be fixed very satisfactorily by a pyrocatechol/formaldehyde resin containing an aromatic diamine.

This fixing always takes place by simultaneous adsorption and reduction. Hexavalent chromium thus changes to a valency of 3 and divalent mercury to a valency of 1. It is thus necessary for the resin to be in the reduced form. A resin which has undergone an oxidation treatment by any chemical means no longer fixes hexavalent chromium or divalent mercury. On the other hand, if this resin is reduced, it can be used again to fix hexavalent chromium or divalent mercury.

Fixing can only take place within a rather restricted pH range, generally from 1.5 to 6. The more acid is the pH, the more the concentration of metal ion must be lowered; the resin can undergo degradation in a very oxidising and very acid medium. Thus a solution of potassium dichromate of concentration 50 g/l and pH 5 does not degrade the resin. On the other hand, in the presence of N/10 sulphuric acid and with the concentration of potassium dichromate of 0.3 g/l, the resin begins to undergo degradation.

The concentration of the solutions to be treated must thus vary depending on the pH of these solutions. However, it is generally desirable not to exceed a concentration of 10 to 20 g of chromium/liter and 1 to 5 g of mercury/litre. mercury/liter.

In the case of more concentrated solutions such as, for example, spent chromium plating baths in which the concentration of chromium is from, say, 120 to 200 g/l, it is desirable to use the resins only after the concentration has been lowered, by any appropriate means.

The capacity of the resins for fixing hexavalent chromium is close to the theoretical value calculated from the possible reduction and is as much as 28% by weight of $Cr^{6+}$. The capacity for fixing divalent mercury can exceed 25% by weight.

The maximum concentration of hexavalent chromium and divalent mercury in the solutions treated by the resin is generally less than 0.1 mg/l; this value corresponds to the limit of sensitivity of the reaction with diphenyl-carbazide. (In an acid medium and in the presence of hexavalent chromium, a solution of diphenyl-carbazide in alcohol gives a violet colouration. In the presence of mercury and in a neutral or buffered medium, a violet-tinged blue colouration is obtained).

Chromium fixed to the resin can be recovered by eluting with a non-oxidising strong acid such as concentrated hydrochloric acid or concentrated sulphuric acid. Mercury must be reduced to the state of the metal, for example by means of a solution of sodium bisulphite. It can then be removed by centrifuging or distillation in vacuo.

It is possible to regenerate the resin after eluting the metal retained, by treating it, with a reducing solution such as a sodium bisulphite or sodium hydrosulphite solution. It is preferred to treat the resin with a 20% aqueous solution of sodium bisulphite for at least 2 hours. After washing with water, the resin, now in the reduced state, can be used again to fix chromium.

The number of times the resin can be used is however not unlimited, since the passage of very acid and very oxidising solutions can degrade the resin.

The resin according to the invention possesses a certain number of advantages. In particular: It makes it possible to reduce the content of hexavalent chromium or mercury to below the threshold of sensitivity of the reaction with diphenyl-carbazide (0.1 mg/l); the capacity for fixing hexavalent chromium is very close to the theoretical capacity (up to 28%); the capacity for fixing divalent mercury is greater than 25%; chromium can be recovered easily by eluting with acid; and the resin can be regenerated easily by means of a reducing solution.

The following Examples further illustrate the present invention.

EXAMPLE 1

720 cm³ of ortho-dichlorobenzene, 240 cm³ of isoamyl alcohol, 280 cm³ of water, 260 g of 30% formaldehyde, 186 g of pyrocatechol, 35 g of meta-phenylenediamine and 20 cm³ of concentrated hydrochloric acid are introduced into a 3 liter flask equipped with a central stirrer.

A nitrogen atmosphere is introduced into the apparatus and the reaction mixture is heated under reflux, whilst stirring vigorously. The polycondensation reaction takes place as soon as the temperature reaches approximately 70°C. Gelling of the drops of reagents dispersed throughout the reaction medium then takes place. Heating is continued for 2 hours. The solid material is filtered off, washed with acetone and then dried in vacuo in an oven at 100°C.

232 g of granules which are brown in colour and which have a diameter of less than 3 mm and an apparent density of 0.7 are obtained. The granules obtained are then screened in order to remove the granules of diameter less than 0.2 mm.

A column of internal diameter 9 mm is packed with 11.3 g of resin over a height of 25 cm. The column is filled with distilled water by suction in vacuo in order to avoid the presence of bubbles. Thereafter, an aqueous solution of potassium dichromate containing 1 g of chromium/liter and 1 g of sulphuric acid/liter (N/50) is passed through. Its pH is 1.7. The flow rate is 100 cm³/hour.

As soon as it comes into contact with the solution, the resin turns black. It is found that the solution which has passed through the column does not contain any detectable chromium ions since there is a negative reaction with diphenyl-carbazide.

After 1,240 cm³ have passed, all of the resin has become black and the yellow coloration of the dichromate is apparent at the outlet; the reaction with diphenyl-carbazide becomes positive.

Washing with water is effected in order to remove the excess dichromate, and the chromium content of a sample of the resin is measured. An average content of 11% is found (measurement made by means of atomic absorption spectrometry using a Perkin Elmer apparatus, as described in "Spectrometrie d'absorption atomique" (Atomic absorption spectrometry) by Maurice PINTA, published by MASSON et Cie (1971), volume 2, pages 419 and 420.

100 cm$^3$ of a concentrated solution of hydrochloric acid are then passed through. The chromium is thus eluted in the form of the dark green chloride. The column is then washed with water and then a 20% solution of sodium bisulphite is passed through very slowly for 2 hours. The process is completed by washing with distilled water.

The regenerated resin can fix chromium with an identical yield.

EXAMPLE 2

A column of internal diameter 9 mm is packed, over a height of 25 cm, with 14 g of the resin prepared according to Example 1.

After filling the column with distilled water, an aqueous solution of mercuric chloride which contains 0.1 g of mercury/liter and which has a pH of 5 is passed through. The flow rate is approximately 50 cm$^3$/hour. The forward movement of the solution of mercuric chloride can be followed because a greyish deposit mercurous chloride forms.

After 10.5 liters of the solution of mercuric chloride have passed through, still no trace of mercury can be detected at the outlet of the column (by reaction with diphenyl-carbazide).

I claim:

1. Process for extracting a reducible metal ion from an aqueous solution containing it, wherein the pH of the aqueous solution is from 1.5 to 6, which comprises contacting said solution with an extracting amount of a water-insoluble granulated redox resin obtained by a process which comprises the following steps, in sequence:
   i. polycondensating in suspension in a water-immiscible inert diluent containing an alcohol of 3 to 20 carbon atoms, a mixture of formaldehyde, pyrocatechol and an aromatic diamine, in which mixture the diamine constitutes 5 to 35 mol % of the mixture of pyrocatechol and diamine, the formaldehyde constitutes 1.1 to 1.5 moles per mol of pyrocatechol and 2.2 to 3 mols per mol of diamine,
   ii. heat treating the polycondensate or reaction mixture containing the polycondensate at about 70° to about 110°C., and
   iii. removing the alcohol present in the resulting resin.

2. Process according to claim 1 in which the aqueous solution contains hexavalent chromium or divalent mercury ions.

3. Process according to claim 1 in which the inert water-immiscible diluent has a density from 1 to 1.3 and a boiling point of at least 100°C.

4. Process according to claim 1 in which the alcohol is isoamyl alcohol.

5. Process according to claim 1 in which the aromatic diamine is diamono diphenylmethane, ortho-phenylenediamine, para-phenylenediamine or meta-phenylenediamine.

6. Process according to claim 1 in which the diamine constitutes 10 to 32 mol % of the mixture of pyrocatechol and diamine.

* * * * *